United States Patent
He et al.

(10) Patent No.: US 11,575,240 B2
(45) Date of Patent: Feb. 7, 2023

(54) ROD-TYPE PHOTONIC CRYSTAL FIBER AMPLIFIER

(71) Applicant: WUHAN YANGTZE SOTON LASER CO., LTD., Wuhan (CN)

(72) Inventors: Fei He, Wuhan (CN); Kangkang Chen, Wuhan (CN)

(73) Assignee: WUHAN YANGTZE SOTON LASER CO., LTD., Wuhan (CN)

( * ) Notice: Subject to any disclaimer, the term of this patent is extended or adjusted under 35 U.S.C. 154(b) by 379 days.

(21) Appl. No.: 16/841,684

(22) Filed: Apr. 7, 2020

(65) Prior Publication Data

US 2021/0226404 A1 Jul. 22, 2021

(30) Foreign Application Priority Data

Jan. 17, 2020 (CN) .......................... 202010054065.X

(51) Int. Cl.
- *H01S 3/067* (2006.01)
- *H01S 3/094* (2006.01)
- *H01S 3/10* (2006.01)
- *G02B 6/32* (2006.01)
- *G02B 3/08* (2006.01)

(52) U.S. Cl.
CPC .......... *H01S 3/06754* (2013.01); *G02B 6/322* (2013.01); *H01S 3/06741* (2013.01); *H01S 3/094007* (2013.01); *H01S 3/10023* (2013.01); *G02B 3/08* (2013.01)

(58) Field of Classification Search
None
See application file for complete search history.

(56) References Cited

U.S. PATENT DOCUMENTS

| | | | |
|---|---|---|---|
| 7,768,700 B1* | 8/2010 | Savage-Leuchs | .......................... H01S 3/094007 359/341.1 |
| 8,057,106 B1* | 11/2011 | Zhovnirovsky | ........ G02B 6/322 385/139 |
| 8,335,420 B2* | 12/2012 | Beach | ................. H01S 3/06754 385/124 |
| 8,824,519 B1* | 9/2014 | Seurin | ..................... H01S 5/423 372/101 |
| 2011/0176770 A1* | 7/2011 | Zerfas | .................... G02B 6/262 385/39 |

(Continued)

*Primary Examiner* — Eric L Bolda
(74) *Attorney, Agent, or Firm* — True Shepherd LLC; Andrew C. Cheng

(57) ABSTRACT

A rod-type photonic crystal fiber amplifier includes a signal coupling lens, a first dichroic mirror, a first hollow pump coupling lens, and a rod-type photonic crystal fiber. The rod-type photonic crystal fiber comprises a core and a cladding, wherein signal light is coupled into the core of the rod-type photonic crystal fiber through the signal coupling lens, and pump light is coupled into the cladding of the rod fiber through the hollow pump coupling lens. The structure optimizes the coupling between the signal light and the core of the rod-type photonic crystal fiber, and the coupling between the pump light and the cladding of the rod fiber respectively by introducing the hollow pump coupling lens. The purpose of this is to fully optimize the rod-type photonic crystal fiber amplifier, improve the amplification efficiency and improve the efficiency of a manufacturing process.

11 Claims, 3 Drawing Sheets

(56) References Cited

U.S. PATENT DOCUMENTS

2012/0287951 A1* 11/2012 Beach ................ H01S 3/06754
  372/6
2018/0375278 A1* 12/2018 Brunne ................ H01S 3/0064

* cited by examiner

ROD-TYPE PHOTONIC CRYSTAL FIBER AMPLIFIER

CROSS REFERENCE TO THE RELATED APPLICATIONS

This application is based upon and claims priority to Chinese Patent Application No. 202010054065.X, filed on Jan. 17, 2020, the entire contents of which are incorporated herein by reference.

TECHNICAL FIELD

The present invention belongs to the field of lasers, and particularly relates to a rod-type photonic crystal fiber amplifier.

BACKGROUND

A photonic crystal fiber refers to a fiber having a photonic crystal structure. Controlling the distribution and design of the photonic crystal structure can achieve many characteristics not available in a conventional fiber and has wide applications in many fields. High-power fiber amplifiers have the advantages of high efficiency and easy maintenance, etc., and at present, have wide applications in scientific research and industrial fields, especially in ultra-fast high-power fiber lasers, and have wide applications in the fields of microfabrication, physics, biology, chemical control reactions, optical communications, etc. For example, the range of materials that can be used in precise cutting, punching and engraving in the field of precision processing includes glass, sapphire, metal films, polymer organic material films, composite films, semiconductor wafers, ceramics, and diamonds or the like.

A rod-type photonic crystal fiber is typically used in an ultra-fast high-power fiber amplifier. The fiber generally has a large core doped with rare earth elements, such as erbium or ytterbium, as a gain medium of the amplifier. The core of the fiber supports single-mode signal transmission in a large mode area such that high-power and high-energy amplification of a signal is achieved. The fiber usually employs the design structure of an air cladding to conduct pumping, and a thicker outer wall of quartz is used outside the air cladding. The fiber has the appearance of a rod, and is laid flat and straight when in use, and cannot be bent and coiled as a conventional fiber.

The rod-type photonic crystal fiber amplifier can employ the structure of a forward pump, a backward pump, or a bidirectional pump. Taking the forward pump as an example, the amplifier usually employs the structure of a dichroic mirror plus a lens to realize the coupling between the pump and the fiber cladding and the coupling between a signal and the fiber core. The rod-type photonic crystal fiber is characterized by a large core diameter of typically more than 60 µm. The fiber also has a low numerical aperture of typically below 0.03, which is a design characteristic that the fiber can support single-mode transmission. Due to the low numerical aperture of the core, a lens with a larger focal length (such as being greater than 30 mm) is more conducive to the coupling of a collimated incident signal (such as having a spot diameter of 2 mm) to the core. The rod-type photonic crystal fiber typically employs the design of an air cladding with a cladding diameter of typically more than 200 µm. The air cladding supports a high numerical aperture of typically above 0.5, which is more conducive to pump coupling. Due to the high numerical aperture of the cladding, a lens having a smaller focal length (such as being less than 25 mm) is more conducive to the coupling of collimated pump light (such as having a pump spot diameter of 25 mm) to the cladding.

However, in a conventional amplifier structure, one and the same lens typically serves as the structure for both signal coupling and pump coupling. As shown in FIG. 1, the selection of optical parameters of the lens usually results from compromise under the comprehensive consideration of signal coupling and pump coupling conditions and cannot realize and satisfy the optimal performance of pump coupling and signal coupling at the same time. Additionally, in the manufacturing and aligning of an amplifier, the optimization of a coupling lens may affect both pump coupling and signal coupling. For example, during optimizing the efficiency of pump coupling, the position of the coupling lens is adjusted such that the pump coupling is optimized. However, the operation is likely to cause poor signal coupling at the same time.

As the power of a laser is increasing, the requirements for coupling become higher and higher, the signal not coupled into the core and the pump not coupled into the cladding may cause heating and deformation of the fiber, or even cause damage to the fiber. As the laser productivity increases, higher requirements are made for the efficiency of manufacturing and aligning of lasers, and conventional amplifier structures already cannot meet the production requirements of high-power laser amplifiers.

SUMMARY

In view of this, the present invention provides a rod-type photonic crystal fiber amplifier, which not only improves the efficiency of signal coupling and pump coupling, but also improves the efficiency of manufacturing and aligning.

The technical solution adopted in the present invention is: a rod-type photonic crystal fiber amplifier comprising a signal coupling lens, a first dichroic mirror, a first hollow pump coupling lens and a rod-type photonic crystal fiber, the signal coupling lens being used for focusing signal light, and the first dichroic mirror, the first hollow pump coupling lens and the rod-type photonic crystal fiber being arranged in sequence in an optical path resulting from the focusing through the signal coupling lens, wherein the first dichroic mirror, the first hollow pump coupling lens and the rod-type photonic crystal fiber are on the same optical axis, and the first dichroic mirror is arranged obliquely.

Preferably, the signal coupling lens is placed directly above the dichroic mirror, and the focused signal light is reflected by the first dichroic mirror into the first hollow pump coupling lens, the signal light prior to reflection being perpendicular to that posterior to the reflection.

Preferably, the signal coupling lens is placed in front of the first dichroic mirror, the signal coupling lens is in the same optical axis with the first dichroic mirror, the first hollow pump coupling lens and the rod-type photonic crystal fiber, and the focused signal light is transmitted through the first dichroic mirror into the first hollow pump coupling lens, the direction of the signal light remaining unchanged before and after the transmission.

Preferably, the rod-type photonic crystal fiber is a rod fiber having a photonic crystal structure, and the rod-type photonic crystal fiber comprises a core and a cladding, the core having a diameter greater than 30 µm and a numerical aperture less than 0.1, and the cladding having a diameter greater than 200 µm and a numerical aperture greater than 0.3.

Preferably, the core of the rod-type photonic crystal fiber is doped with one or more of rare earth elements including erbium, ytterbium, neodymium and holmium.

Preferably, the signal coupling lens is one of a plano-convex lens, a biconvex lens, a meniscus lens, and an aspherical lens.

Preferably, the first hollow pump coupling lens is a plano-convex lens, a biconvex lens, a meniscus lens or an aspherical lens with a through hole in the center thereof.

Preferably, the through hole has a diameter less than 1 mm.

Preferably, the first hollow pump coupling lens is a plano-convex lens, a biconvex lens, a meniscus lens or an aspherical lens with a plano lens in the center thereof.

Preferably, a pump light spatial shaping device is further comprised, the pump light spatial shaping device being a conical lens, and the conical lens being placed in front of the first dichroic mirror.

The beneficial effects of the present invention are as follows: The present invention provides a rod-type photonic crystal fiber amplifier which changes the fact in a conventional amplifier structure that one and the same lens must serve as the structure for both signal coupling and pump coupling, a hollow pump coupling lens is introduced in the present invention such that the coupling between the signal light and the core of the rod-type photonic crystal fiber and the coupling between the pump light and the cladding of the rod fiber may be optimized respectively, thus fully optimizing the rod-type photonic crystal fiber amplifier, improving the amplification efficiency and improving the efficiency of a manufacturing process.

Reference signs: 1—Signal coupling lens, 2—First dichroic mirror, 3—First hollow pump coupling lens, 31—Through hole, 4—Rod-type photonic crystal fiber, 41—Core, 42—Cladding, 5—Second hollow pump coupling lens, 6—Second dichroic mirror, 7—Signal collimating lens, 8—Conical lens, 9—Special-shaped lens.

DETAILED DESCRIPTION OF THE EMBODIMENTS

To make the objectives, technical solutions, and advantages of the present invention clear, the present invention will be described in further detail below with reference to the drawings and embodiments. It should be understood that the particular embodiments described herein are merely intended to explain the present invention and are not intended to limit the present invention. In addition, the technical features involved in various implementations of the present invention as described below can be combined with each other so long as they do not conflict with each other.

Embodiment I

Figure 1:
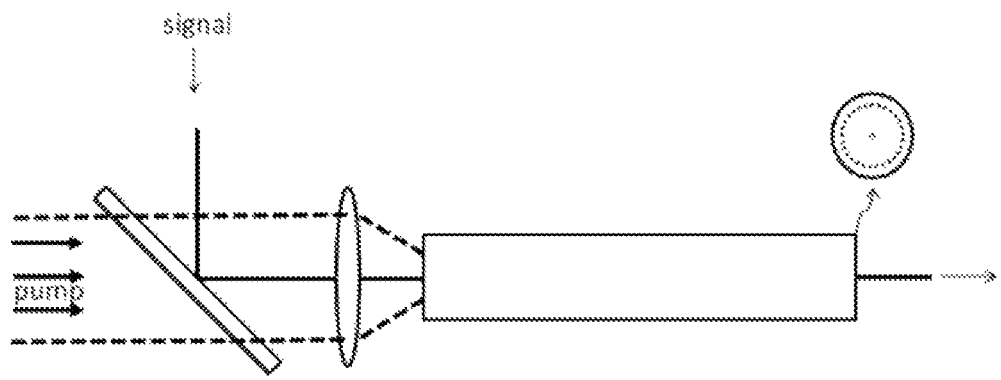
FIG. 1 is a schematic structural diagram of a conventional rod-type photonic crystal fiber amplifier.
Figure 2:
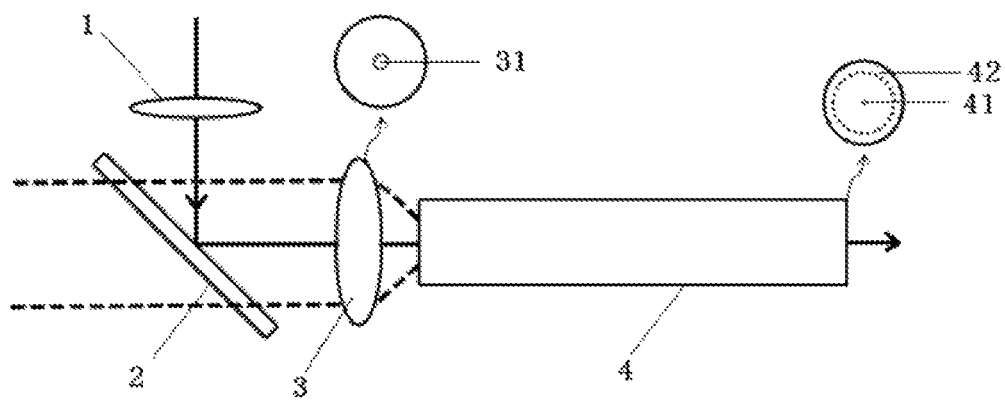
FIG. 2 is a schematic structural diagram of a rod-type photonic crystal fiber amplifier provided by embodiment I of the present invention.

As shown in FIG. 2, a rod-type photonic crystal fiber amplifier provided in this embodiment comprises a signal coupling lens 1, a first dichroic mirror 2, a first hollow pump coupling lens 3 and a rod-type photonic crystal fiber 4. The signal coupling lens 1 is used for focusing signal light, and the first dichroic mirror 2, the first hollow pump coupling lens 3 and the rod-type photonic crystal fiber 4 are arranged in sequence in an optical path resulting from the focusing through the signal coupling lens 1, wherein the first dichroic mirror 2 is arranged at an inclination of 45°, the signal coupling lens 1 is placed above the first dichroic mirror 2, and the first dichroic mirror 2 reflects the light focused through the signal coupling lens 1 into the first hollow pump coupling lens 3 and the rod-type photonic crystal fiber 4.

In this embodiment, the signal coupling lens 1 is one of a plano-convex lens, a biconvex lens, a meniscus lens, and an aspherical lens, and the signal coupling lens 1 has a diameter of 25 mm and a focal length of 60 mm. The first dichroic mirror 2 reflects signal light with a central wavelength of 1030 nm and transmits pump light with a central wavelength of 976 nm, and the first dichroic mirror 2 has a diameter of 25 mm. The first hollow pump coupling lens 3 is one of a plano-convex lens, a biconvex lens, a meniscus lens, and an aspheric lens with a through hole 31 in the center thereof, and the first hollow pump coupling lens 3 has a diameter of 20 mm and a focal length of 20 mm, wherein the through hole 31 has a diameter less than 1 mm. The rod-type photonic crystal fiber 4 is a rod fiber having a photonic crystal structure, and the rod-type photonic crystal fiber 4 comprises a core 41 and a cladding 42, the core 41 having a diameter of 80 μm and a numerical aperture of 0.02, and the cladding 42 having a diameter of 350 μm and a numerical aperture greater than 0.3, wherein the core 41 is doped with rare earth elements including erbium, ytterbium, neodymium and holmium, etc., and the core 41 may be doped with one or more of the rare earth elements. The optical length from the signal coupling lens 1 to the first dichroic mirror 2 is 20 mm, the optical length from the first dichroic mirror 2 to the first hollow pump coupling lens 3 is 20 mm, the optical length from the first hollow pump coupling lens 3 to the rod-type photonic crystal fiber 4 is 20 mm, and the optical length from the signal coupling lens 1 to the rod-type photonic crystal fiber 4 is 60 mm.

The rod-type photonic crystal fiber amplifier provided in this embodiment has an operation process as follows:

Collimated signal light with a center wavelength of 1030 nm and a spot diameter of 1 mm is first focused through the signal coupling lens 1 and then reflected by the first dichroic mirror 2. The included angle between the signal light and an upper surface of the first dichroic mirror 2 is 45°. The included angle between emergent light resulting from the signal light reflected from the upper surface of the first dichroic mirror 2 and incident light is 90°. The reflected signal light passes through the through hole 31 of the first hollow pump coupling lens 3, no optical effect occurs between the signal light and the first hollow pump coupling lens 3, and the signal light has a diameter less than 80 μm and a divergence angle smaller than the numerical aperture of the core 41 at the core 41 of the rod-type photonic crystal fiber 4, such that the signal light may be completely coupled into the core 41 of the rod-type photonic crystal fiber 4 and the coupling efficiency is greater than 95%; and collimated pump light with a center wavelength of 976 nm and a spot diameter of 15 mm first passes through the first dichroic mirror 2. The pump light forms an included angle of 45° with a lower surface of the first dichroic mirror 2. The pump light is transmitted through the first dichroic mirror 2 and has no change in its transmission direction and is then focused through the first hollow pump coupling lens 3, and the focused pump light has a diameter less than 350 μm and a divergence angle smaller than the numerical aperture of the cladding at the cladding 42 of the rod-type photonic crystal fiber 4, such that the pump light may be completely coupled into the cladding 42 of the rod-type photonic crystal fiber 4 and the coupling efficiency is greater than 95%.

The optical length from the signal coupling lens 1 to the first hollow pump coupling lens 3 is 40 mm. The signal light has a spot diameter of about 330 μm at the position of the first hollow pump coupling lens 3, and the through hole 31 of the first hollow pump coupling lens 3 has a diameter of 350 μm, which is greater than the spot diameter of the signal light at the position of the first hollow pump coupling lens 3, such that no optical effect occurs between the signal light and the first hollow pump coupling lens 3. On the other hand, since the through hole 31 of the first hollow pump coupling lens 3 has a diameter of 350 μm which is close to the diameter of the cladding 42 of the rod-type photonic crystal fiber 4, the pump light passes through a hollow portion of the first hollow pump coupling lens 3. Although no optical focusing occurs, the entry of the pump light into the cladding 42 of the rod-type photonic crystal fiber 4 is not affected, and the coupling efficiency will not be reduced.

The adjustments of the above-mentioned rod-type photonic crystal fiber amplifier comprise the steps of:

1. fixing the rod-type photonic crystal fiber 4;
2. adjusting the position and angle of the first dichroic mirror 2 to optimize the reflectance of the signal light and the transmittance of the pump light;
3. turning on the signal light and turning off the pump light, and adjusting the position and angle of the signal light and the position and angle of the signal coupling lens 1 to optimize the efficiency of signal coupling to be above 95%;
4. turning on the pump light to appropriate power and turning off the signal light, and adjusting the position and angle of the pump light and the position and angle of the first hollow pump coupling lens 3 to optimize the efficiency of pump coupling to be above 95%; and
5. turning on both the signal light and the pump light, repeating the adjustments of steps 3 and 4, and optimizing the signal gain.

Embodiment II

Figure 3:
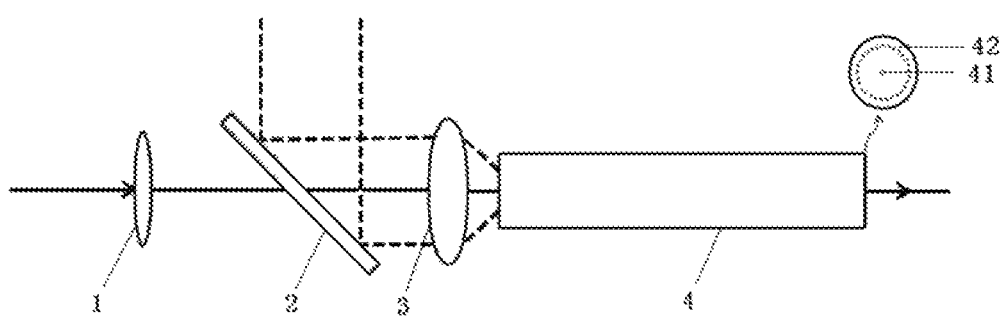
FIG. 3 is a schematic structural diagram of a rod-type photonic crystal fiber amplifier provided by embodiment II of the present invention.

As shown in FIG. 3, a rod-type photonic crystal fiber amplifier provided in this embodiment comprises a signal coupling lens 1, a first dichroic mirror 2, a first hollow pump coupling lens 3 and a rod-type photonic crystal fiber 4. The signal coupling lens 1, the first dichroic mirror 2, the first hollow pump coupling lens 3 and the rod-type photonic crystal fiber 4 are on the same optical axis, wherein the signal coupling lens 1 is used for focusing signal light, and the first dichroic mirror 2, the first hollow pump coupling lens 3 and the rod-type photonic crystal fiber 4 are arranged in sequence in an optical path resulting from the focusing through the signal coupling lens 1; and wherein the first dichroic mirror 2 is arranged at an inclination of 45°, and the light focused through the signal coupling lens 1 is transmitted through the first dichroic mirror 2 into the first hollow pump coupling lens 3 and the rod-type photonic crystal fiber 4.

In this embodiment, the signal coupling lens 1 is one of a plano-convex lens, a biconvex lens, a meniscus lens, and an aspherical lens, and the signal coupling lens 1 has a diameter of 25 mm and a focal length of 60 mm. The first dichroic mirror 2 reflects signal light with a central wavelength of 1030 nm and transmits pump light with a central wavelength of 976 nm, and the first dichroic mirror 2 has a diameter of 25 mm. The first hollow pump coupling lens 3 is one of a plano-convex lens, a biconvex lens, a meniscus lens, and an aspheric lens with a through hole 31 in the center thereof, and the first hollow pump coupling lens 3 has a diameter of 20 mm and a focal length of 20 mm, wherein the through hole 31 has a diameter less than 1 mm. The rod-type photonic crystal fiber 4 is a rod fiber having a photonic crystal structure, and the rod-type photonic crystal fiber 4 comprises a core 41 and a cladding 42. The core 41 having a diameter of 80 μm and a numerical aperture of 0.02, and the cladding having a diameter of 350 μm and a numerical aperture greater than 0.3, wherein the core 41 is doped with rare earth elements including erbium, ytterbium, neodymium and holmium, etc., and the core 41 may be doped with one or more of the rare earth elements. The optical length from the signal coupling lens 1 to the first dichroic mirror 2 is 20 mm. The optical length from the first dichroic mirror 2 to the first hollow pump coupling lens 3 is 20 mm. The optical length from the first hollow pump coupling lens 3 to the rod-type photonic crystal fiber 4 is 20 mm and the optical length from the signal coupling lens 1 to the rod-type photonic crystal fiber 4 is 60 mm.

The rod-type photonic crystal fiber amplifier provided in this embodiment has an operation process as follows:

Collimated signal light with a center wavelength of 1030 nm and a spot diameter of 1 mm is first focused through the signal coupling lens 1 and then transmitted through the first dichroic mirror 2 into the through hole 31 of the first hollow pump coupling lens 3 No optical effect occurs between the signal light and the first hollow pump coupling lens 3, and the signal light has a diameter less than 80 μm and a divergence angle smaller than the numerical aperture of the core 41 at the core 41 of the rod-type photonic crystal fiber 4, such that the signal light may be completely coupled into the core 41 of the rod-type photonic crystal fiber 4 and the coupling efficiency is greater than 95%; and collimated pump light with a center wavelength of 976 nm and a spot diameter of 15 mm is first reflected by the first dichroic mirror 2. The pump light forms an included angle of 45° with an upper surface of the first dichroic mirror 2. The included angle between emergent light resulting from the pump light reflected from the upper surface of the first dichroic mirror 2 and incident light is 90°. Thereafter the pump light is focused through the first hollow pump coupling lens 3, and the focused pump light has a diameter less than 350 μm and a divergence angle smaller than the numerical aperture of the cladding 42 at the cladding 42 of the rod-type photonic crystal fiber 4, such that the pump light may be completely coupled into the cladding 42 of the rod-type photonic crystal fiber 4 and the coupling efficiency is greater than 95%.

The optical length from the signal coupling lens 1 to the first hollow pump coupling lens 3 is 40 mm. The signal light has a spot diameter of about 330 μm at the position of the first hollow pump coupling lens 3, and the central through hole of the first hollow pump coupling lens 3 has a diameter of 350 μm, which is greater than the spot diameter of the signal light at the position of the first hollow pump coupling lens 3, such that no optical effect occurs between the signal light and the first hollow pump coupling lens 3. On the other hand, since the through hole 31 of the first hollow pump coupling lens 3 has a diameter of 350 μm which is close to the diameter of the cladding 42 of the rod-type photonic crystal fiber 4, the pump light passes through a hollow portion of the first hollow pump coupling lens 3. Although no optical focusing occurs, the entry of the pump light into the cladding of the rod-type photonic crystal fiber 4 is not affected, and the coupling efficiency will not be reduced.

The adjustments of the above-mentioned rod-type photonic crystal fiber amplifier comprise the steps of:

1. fixing the rod-type photonic crystal fiber 4;
2. adjusting the position and angle of the first dichroic mirror 2 to optimize the reflectance of the signal light and the transmittance of the pump light;
3. turning on the signal light and turning off the pump light, and adjusting the position and angle of the signal light and the position and angle of the signal coupling lens 1 to optimize the efficiency of signal coupling to be above 95%;
4. turning on the pump light to appropriate power and turning off the signal light, and adjusting the position and angle of the pump light and the position and angle of the first hollow pump coupling lens 3 to optimize the efficiency of pump coupling to be above 95%; and
5. turning on both the signal light and the pump light, repeating the adjustments of steps 3 and 4, and optimizing the signal gain.

Embodiment III

Figure 4:
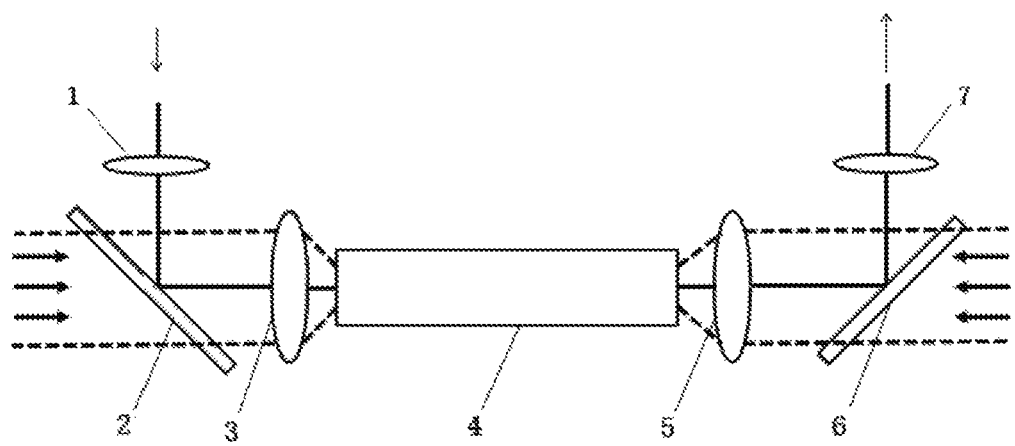
FIG. 4 is a schematic structural diagram of a rod-type photonic crystal fiber amplifier provided by embodiment III of the present invention.

As shown in FIG. 4, on the basis of embodiment I described above, an output end of the rod-type photonic crystal fiber 4 is also provided with a signal collimating lens 7, a second dichroic mirror 6 and a second hollow pump coupling lens 5 which are respectively symmetrical with the signal coupling lens 1, the first dichroic mirror 2 and the first hollow pump coupling lens 3.

In this embodiment, the second hollow pump coupling lens 5 has a diameter of 20 mm and a focal length of 20 mm. The second dichroic mirror 6 has a diameter of 25 mm, the signal collimating lens 7 has a diameter of 25 mm and a focal length of 60 mm. The optical length from the signal collimating lens 7 to the second dichroic mirror 6 is 20 mm. The optical length from the second dichroic mirror 6 to the second hollow pump coupling lens 5 is 20 mm. The optical length from the second hollow pump coupling lens 5 to the output end of the rod-type photonic crystal fiber 4 is 20 mm, and the optical length from the signal collimating lens 7 to the output end of the rod-type photonic crystal fiber 4 is 60 mm.

On the basis of embodiment I, an operation process of the rod-type photonic crystal fiber amplifier provided in this embodiment further comprises:

The signal light with a center wavelength of 1030 nm that is output from the rod-type photonic crystal fiber 4, first passes through a central through hole portion of the second hollow pump coupling lens 5. No optical effect occurs between the signal light and the second hollow pump coupling lens 5. The signal light after passing through the second hollow pump coupling lens 5 is reflected by an upper surface of the second dichroic mirror 6, and the reflected signal light is finally collimated by the signal collimating lens 7 and is then emitted; and collimated backward pump light with a center wavelength of 976 nm and a spot diameter of 15 mm first passes through the second dichroic mirror 6. The pump light forms an included angle of 45° with a lower surface of the second dichroic mirror 6. The backward pump light is transmitted through the second dichroic mirror 6 and has no change in its transmission direction. The backward pump light is then focused through the second hollow pump coupling lens 5, and the focused backward pump light has a diameter less than 350 μm and a divergence angle smaller than the numerical aperture of the cladding 42 at the cladding 42 at the output end of the rod-type photonic crystal fiber 4, such that the backward pump light may be completely coupled into the cladding 42 of the rod-type photonic crystal fiber 4 and the coupling efficiency is greater than 95%.

Embodiment IV

Figure 5:
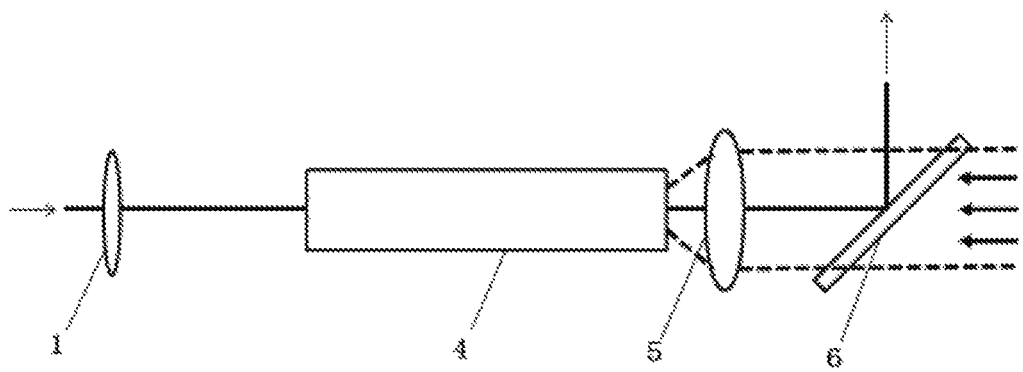
FIG. 5 is a schematic structural diagram of a rod-type photonic crystal fiber amplifier provided by embodiment IV of the present invention.

As described in FIG. 5, on the basis of embodiment III, only the signal coupling lens 1 is in the forward direction of the rod-type photonic crystal fiber 4, with the first dichroic mirror 2, the first hollow pump coupling lens 3 and forward pump light being removed.

In this embodiment, the signal coupling lens 1 has a diameter of 25 mm and a focal length of 60 mm. The second hollow pump coupling lens 5 has a diameter of 20 mm and a focal length of 20 mm. The second dichroic mirror 6 has a diameter of 25 mm. The optical length from the second dichroic mirror 6 to the second hollow pump coupling lens 5 is 20 mm. The optical length from the second hollow pump coupling lens 5 to the output end of the rod-type photonic crystal fiber 4 is 20 mm, and the optical length from the signal coupling lens 1 to the rod-type photonic crystal fiber 4 is 60 mm.

The collimated signal light with a center wavelength of 1030 nm and a spot diameter of 1 mm is first focused through the signal coupling lens 1, and the focused signal light is coupled into the core 41 of the rod-type photonic crystal fiber 4 with a coupling efficiency greater than 95%.

The collimated backward pump light with a center wavelength of 976 nm and a spot diameter of 15 mm first passes through the second dichroic mirror 6. The pump light forms an included angle of 45° with a lower surface of the second dichroic mirror 6. The backward pump light is transmitted through the second dichroic mirror 6 and has no change in its transmission direction. The backward pump light is then focused through the second hollow pump coupling lens 5, and the focused backward pump light has a diameter less than 350 μm and a divergence angle smaller than the numerical aperture of the cladding 42 at the cladding 42 at the output end of the rod-type photonic crystal fiber 4, such that the backward pump light may be completely coupled into the cladding 42 of the rod-type photonic crystal fiber 4 and the coupling efficiency is greater than 95%.

Embodiment V

Figure 6:
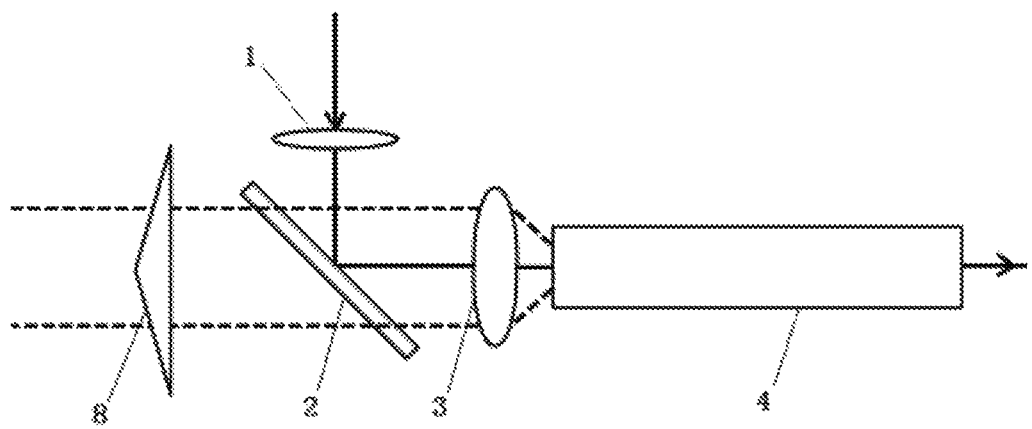
FIG. 6 is a schematic structural diagram of a rod-type photonic crystal fiber amplifier provided by embodiment V of the present invention.

As shown in FIG. 6, on the basis of embodiment I, the rod-type photonic crystal fiber amplifier further comprises a conical lens 8. The conical lens 8 is arranged on a left side of a dichroic mirror 2. The dichroic mirror 2 is used for shaping incident pump light into a ring-shaped light spot with an inner diameter of 2 mm and an outer diameter of 15 mm.

The ring-shaped pump light passes through the first hollow pump coupling lens 3, and the first hollow pump coupling lens 3 has a contour larger than and covering the incident ring-shaped pump light, such that the coupling of the ring-shaped pump light into the cladding of the rod-type photonic crystal fiber 4 is not affected and the coupling efficiency will not be reduced.

Embodiment VI

Figure 7:
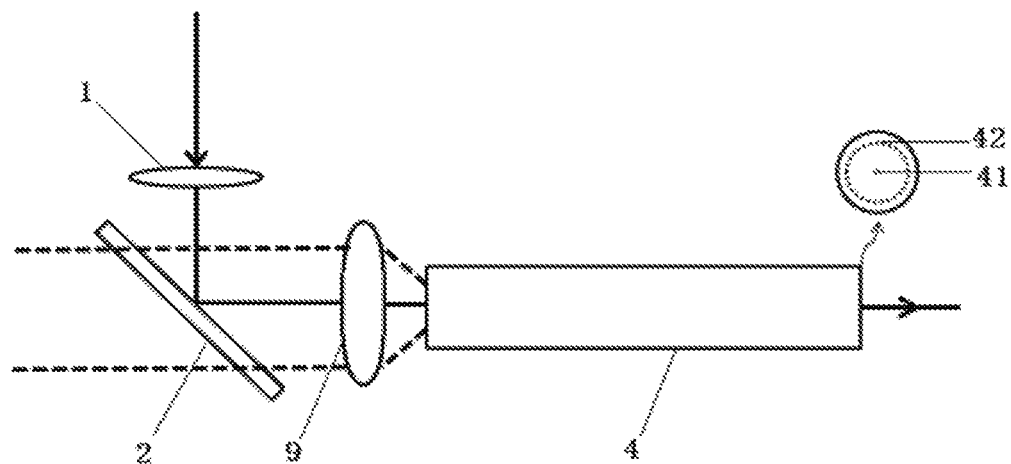
FIG. 7 is a schematic structural diagram of a rod-type photonic crystal fiber amplifier provided by embodiment VI of the present invention.
Figure 8:
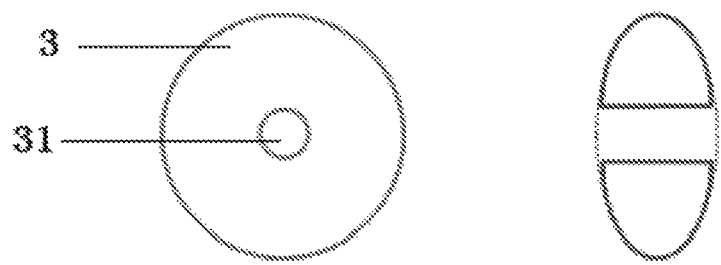
FIG. 8 is a schematic structural diagram of a hollow pump coupling lens and a special-shaped lens in an embodiment of the present invention.
Figure 8:
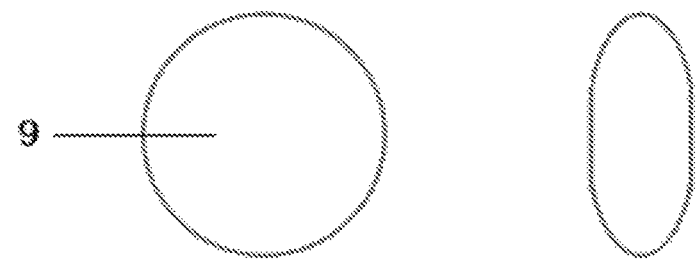

In embodiments I to V described above, the first hollow pump coupling lens 3 may be a special-shaped lens 9 which has a flat surface rather than a through hole in the central portion and has a plano-convex, biconvex, meniscus, or aspherical contour at the other portions. As shown in FIGS. 7 and 8, the signal light is not focused when passing through the central portion of the special-shaped lens 9.

In the description of the present invention, the terms "one side", "the other side", "upper", "lower", "bottom", "inner", "outer" etc. indicate orientations or position relationships based on the orientations or position relationships shown in the drawings and are intended to facilitate the description of the present invention and simplify the description only, rather than indicate or imply that a device or element referred to must have a particular orientation or be constructed and operated in a particular orientation, and hence cannot be construed as limiting the present invention.

The above contents are further detailed descriptions made for the present invention in conjunction with particular preferred embodiments, and it should not be interpreted that the particular embodiments of the present invention are only limited to these descriptions. For a person of ordinary skill in the art, various simple deductions and substitutes can be made without departing from the concept of the present invention, which should be considered as falling within the scope of protection of the present invention.

The invention claimed is:

1. A rod-type photonic crystal fiber amplifier, comprising: a signal coupling lens, a first dichroic mirror, a first hollow pump coupling lens and a rod-type photonic crystal fiber, wherein the signal coupling lens is configured to focus a signal light to obtain an optical path, and the first dichroic mirror, the first hollow pump coupling lens and the rod-type photonic crystal fiber are arranged in sequence in the optical path obtained through the signal coupling lens; the first dichroic mirror, the first hollow pump coupling lens and the rod-type photonic crystal fiber are on a same optical axis, and the first dichroic mirror is arranged obliquely, wherein the signal light and pump light both move along the same optical axis to simultaneously travel through the first hollow pump coupling lens, wherein the first hollow pump coupling lens comprises a hollow part, such that pump light traveling along the same optical axis is transmitting through and optically affected by the first hollow pump coupling lens, and the signal light traveling along the same optical axis passes through the hollow part of the first hollow pump coupling lens in an optically unaffected manner.

2. The rod-type photonic crystal fiber amplifier according to claim 1, wherein the signal coupling lens is placed directly above the first dichroic mirror, and the signal light is reflected by the first dichroic mirror into the first hollow pump coupling lens, wherein the signal light prior to a reflection is perpendicular to the signal light posterior to the reflection.

3. The rod-type photonic crystal fiber amplifier according to claim 1, wherein the signal coupling lens is placed in front of the first dichroic mirror, the signal coupling lens is in the same optical axis with the first dichroic mirror, the first hollow pump coupling lens and the rod-type photonic crystal fiber, and the signal light is transmitted through the first dichroic mirror into the first hollow pump coupling lens, wherein a direction of the signal light remains unchanged before and after a transmission.

4. The rod-type photonic crystal fiber amplifier according to claim 1, wherein the rod-type photonic crystal fiber is a rod fiber having a photonic crystal structure, and the rod-type photonic crystal fiber comprises a core and a cladding, wherein the core has a diameter greater than 30 μm and a numerical aperture less than 0.1, and the cladding has a diameter greater than 200 μm and a numerical aperture greater than 0.3.

5. The rod-type photonic crystal fiber amplifier according to claim 4, wherein the core of the rod-type photonic crystal fiber is doped with at least one rare earth element selected from the group consisting of erbium, ytterbium, neodymium and holmium.

6. The rod-type photonic crystal fiber amplifier according to claim 1, wherein the signal coupling lens is one of a plano-convex lens, a biconvex lens, a meniscus lens, and an aspherical lens.

7. The rod-type photonic crystal fiber amplifier according to claim 1, wherein the first hollow pump coupling lens is a plano-convex lens, a biconvex lens, a meniscus lens or an aspherical lens, and a through hole is arranged in a center of the plano-convex lens, the biconvex lens, the meniscus lens or the aspherical lens.

8. The rod-type photonic crystal fiber amplifier according to claim 7, wherein the through hole has a diameter less than 1 mm.

9. The rod-type photonic crystal fiber amplifier according to claim 1, further comprising a pump light spatial shaping device, wherein the pump light spatial shaping device is a conical lens, and the conical lens is placed in front of the first dichroic mirror.

10. A rod-type photonic crystal fiber amplifier, comprising: a signal coupling lens, a first dichroic mirror, a first hollow pump coupling lens and a rod-type photonic crystal fiber, wherein the signal coupling lens is configured to focus a signal light to obtain an optical path, and the first dichroic mirror, the first hollow pump coupling lens and the rod-type photonic crystal fiber are arranged in sequence in the optical path obtained through the signal coupling lens; the first dichroic mirror, the first hollow pump coupling lens and the rod-type photonic crystal fiber are on a same optical axis, and the first dichroic mirror is arranged obliquely, wherein the first hollow pump coupling lens comprises a primary part and a secondary part structurally different from the primary part, such that pump light transmits through and optically focused by the first hollow pump, and the signal light transmits through the secondary part of the first hollow pump in an optically unfocused manner.

11. The rod-type photonic crystal fiber amplifier according to claim 10, wherein the primary part of the first hollow pump coupling lens comprises one of a plano-convex lens, a biconvex lens, a meniscus lens and an aspherical lens, and the secondary part of the first hollow pump coupling lens comprises a plano lens that is arranged in a center of the one of the plano-convex lens, the biconvex lens, the meniscus lens and the aspherical lens.

* * * * *